No. 888,927. PATENTED MAY 26, 1908.
M. J. QUINSEY.
BEAN PULLER.
APPLICATION FILED DEC. 19, 1907.

Witnesses

Inventor
Michael J. Quinsey
By
Attorneys

THE NORRIS PETERS CO., WASHINGTON, D. C.

UNITED STATES PATENT OFFICE.

MICHAEL J. QUINSEY, OF HESPERIA, MICHIGAN.

BEAN-PULLER.

No. 888,927.   Specification of Letters Patent.   Patented May 26, 1908.

Application filed December 19, 1907. Serial No. 407,156.

*To all whom it may concern:*

Be it known that I, MICHAEL J. QUINSEY, a citizen of United States, residing at Hesperia, in the county of Oceana, State of Michigan, have invented certain new and useful Improvements in Bean-Pullers; and I do hereby declare the following to be a full, clear, and exact description of the invention, such as will enable others skilled in the art to which it appertains to make and use the same.

This invention has relation to the pulling of beans—that is, the pulling of the bean vines with the pods thereon when the beans are ripe and ready to thresh.

It is a very tedious matter to gather beans when they are ripe ready to pull, and also difficult to do the work without losing some of the pods from the vines which must be subsequently gathered.

I have invented an implement for the purpose which overcomes many of the objections and difficulties heretofore experienced in pulling beans, the objects of which will become apparent to those skilled in the art from an inspection of the annexed drawing forming a part of this specification, and in view of what is illustrated in said drawing I will hereinafter describe its construction clearly pointing out the invention in the appended claim.

Figure 1:
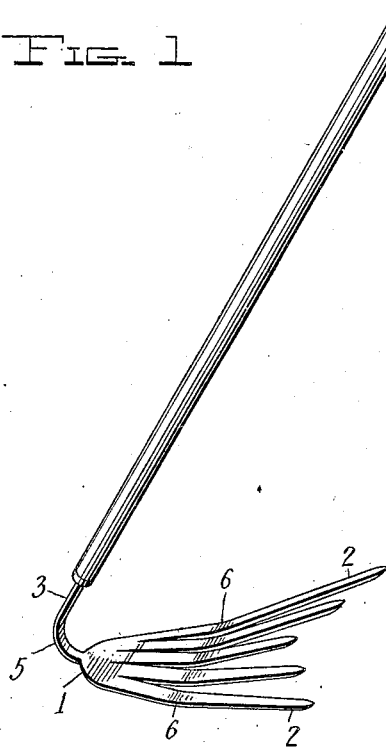
Figure 2:
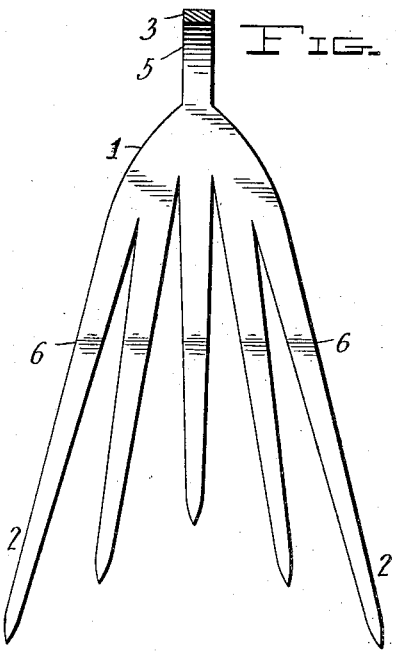
Figure 3:
Figure 4:
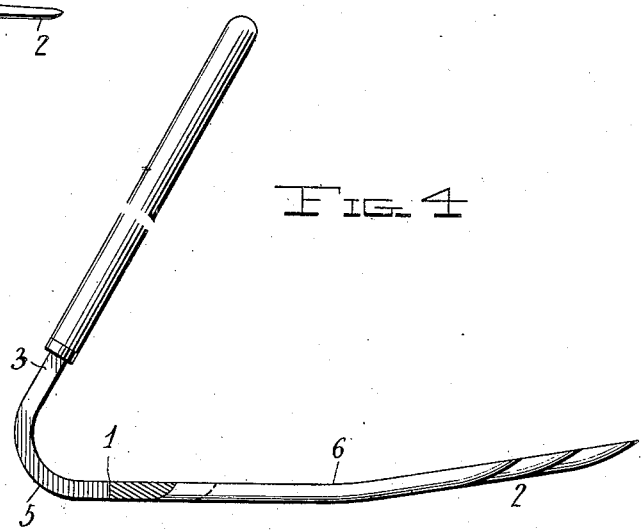

Of the said drawings—Figure 1 is a perspective view of the invention complete. Fig. 2 is an inside plan of the tines and their head. Fig. 3 is a cross section of the middle tine. Fig. 4 is a longitudinal section view of the same running through the head.

Similar figures of reference designate similar parts or features, as the case may be, wherever they occur.

In carrying out my improvement I stamp or form from a suitable blank of steel by any known method, the head, 1, tines, 2, and shank, 3, being features of my improved bean puller.

The shank 3 may be of any suitable length and be formed from the same material that composes the tines. Toward the forward end of the shank 3 the latter is given a recurvate bend as at 5 a little beyond which is formed the head 1 from which head the tines 2 extend in divergent order. The tines will be of a plural number, five being found sufficient for ordinary purposes, though more may be employed if necessary.

The five tines as represented in the drawings are divided so that the outer pair are the longest and extend considerably beyond the next pair inward toward the center, while the middle tine is considerably shorter than the latter. These tines or prongs are given a curved outer or under side as shown in the drawings and a flat inside, so that they will not work harshly on the pods in pulling the beans, but hold them sufficiently well by their inner edges to pull them from the ground.

The head 1 may be somewhat dish-shaped if desired, though this is not essential. At about a central point, 6, of the tines they are given quite a turn upward though they are somewhat curved in the same direction throughout their whole length. The purpose of curving the tines is to facilitate their operation in lifting up and pulling the stalks from the ground.

It is intended that the user of the device shall stand upright in his work of pulling the beans, though of course, he may lean over and assist with his hands in gathering large or scattered bunches.

The making of the bottoms of the tines or prongs round and their tops flat and concaved as well as the curvature of the prongs is of importance in my invention as has already been shown.

What is claimed is—

1. A bean-puller comprising a curved shank, a head connected with the shank, and tines extending in divergent order from the head, and having an abrupt curve upward at substantially the middle of their length.

2. A bean-puller comprising a curved shank, a head and tines formed from steel, the tines extending in divergent order from the head, rounded on their underside and flat on their upperside and having an abrupt upward curve at substantially the middle of their length.

3. A bean-puller comprising a handle, a curved shank, a head connected with the shank and tines extending in divergent order from the head and curved upwardly at their end portions.

In testimony whereof, I affix my signature, in presence of two witnesses.

MICHAEL J. QUINSEY.

Witnesses:
  ARCHIE FOX,
  ROBERT KUSCHNER.